United States Patent [19]

Wiegand

[11] Patent Number: 5,710,708
[45] Date of Patent: Jan. 20, 1998

[54] BACKPLANE CONTROL SYSTEM FOR SPINNING MACHINES

[75] Inventor: Jens Wiegand, Reiterweg, Germany

[73] Assignee: Rieter Ingolstadt Spinnereimaschinenbau AG, Ingolstadt, Germany

[21] Appl. No.: 467,165

[22] Filed: Jun. 6, 1995

[30] Foreign Application Priority Data

Oct. 25, 1994 [EP] European Pat. Off. .............. 94116825

[51] Int. Cl.$^6$ .................................................. G06F 19/00
[52] U.S. Cl. ...................................... 364/470.1; 364/131
[58] Field of Search ................ 364/470.1, 470.11, 364/470.12, 470.13, 470.14, 470.15, 131–134, 137, 138, 470.01

[56] References Cited

U.S. PATENT DOCUMENTS

| | | | |
|---|---|---|---|
| 4,835,699 | 5/1989 | Mallard | 364/470.01 |
| 5,161,111 | 11/1992 | Oehler et al. | 364/470.01 |
| 5,225,988 | 7/1993 | Barea | 364/470.01 |
| 5,381,340 | 1/1995 | Ueda et al. | 364/470.01 |
| 5,517,404 | 5/1996 | Biber et al. | 364/470.01 |

FOREIGN PATENT DOCUMENTS

| | | |
|---|---|---|
| 0135881 | 10/1987 | European Pat. Off. . |
| 0298396 | 1/1989 | European Pat. Off. . |
| 0449458 | 10/1991 | European Pat. Off. . |
| WO9325948 | 12/1993 | WIPO . |

OTHER PUBLICATIONS

European Search Report.
Unterstutzen TCP/IP–UND ISO/OSI–Protokolle, Elektronik 23/1991.
Lon–Das Universelle Netzwerk, Elektronik 22/1991.
CIE Integrated System for the CPCM, Oct., 1993, Conference Record of 1993 IEEE Industry Applications Conference, 28th IAS Annual Meeting.
IBM Technical Disclosure Bulletin, vol. 37, No. 07, Jul., 1994.
Integrating the Numerical Controllerr and the FMS, 15th Annual Conference of IEEE Industrial Electronics Society, Nov., 1989, vol. 1.
Penny–Pinching Networks for Distributed Control, Control Engineering, Mar., 1992, No. 5.
Controller Area Networks and the Protocol Can for Machine Control Systems, Mechatronics, Mar., 1994.
Factory Automation Networking Standards for Distributed Manufacturing 24th Isata, May, 1991.
Drawframe ROB/SB Rotor Spinning Machine R1, Package Transport System Servocone.
Technical Data, Rotor Spinning Machine R1, Package Transport System Servocone.

*Primary Examiner*—Reba I. Elmore
*Assistant Examiner*—Thomas E. Brown
*Attorney, Agent, or Firm*—Dority & Manning

[57] ABSTRACT

A process and control system are provided for controlling a combination of spinning mill machines. The system includes the process of exchanging operational data and measured values between the machines on a plurality of different communication levels which are arranged in a hierarchy. The same communication protocol is used on all of the communication levels to improve the speed and ease of control of the combination of spinning mill machines.

6 Claims, 3 Drawing Sheets

BACKPLANE CONTROL SYSTEM FOR SPINNING MACHINES

BACKGROUND OF THE INVENTION

The technical area of the invention is the area of spinning mill machines such as draw frames, carding machines, and so forth, and therein a process to control a group of spinning machines consisting of several spinning machines ("spinning machine group") and a control network for the construction of a system control for the spinning machine group.

A spinning machine is an example of a spinning mill machine and consists of a plurality of spinning stations, at this time approximately 280 spinning station assembled into one spinning machine. For many applications, it is however necessary to interconnect several spinning machines, so that the control center becomes very important. Based on the spinning machine R1 of Rieter AG according to Prospectus 1431 d of November 1992, up to 32 rotor spinning machines can be connected to their SCC II control center. Each of these rotor spinning machines may have up to 280 spinning stations. The complexity and size that such a system may assume becomes apparent if, in addition, several machine groups of the size mentioned are interconnected in large spinning plants in order to form a large combination.

From the above-mentioned state of the art it can be seen that a spinning machine group in a combination of several spinning machines can be controlled and monitored only if network technology is used. FIGS. 4a, 4b are examples of possible networks in the state of the art in which two topologies are shown in graphic simplification. These topologies function with the Ethernet network, which is the state of the art protocol and is called CSMA/CD (Carrier Sense Multiple Access with Collision Detect). It functions so that a station (a "node") transmits a data or information package when it has first checked whether another node is already active. If another node (node or station) is active, the first mentioned node waits until the network cable is free. In the case that two or more stations transmit simultaneously by coincidence (so-called collisions), they recognize this through active comparison of the transmitted data and from the data measured on the cable. If the measured data does not match the transmitted data, the transmission is interrupted and is repeated only after a waiting period. In the protocol used, the waiting period is determined by means of a random generator which delivers exponentially increasing delay values in repetitions. This can prevent two stations from using repeatedly the same waiting period and from thus being set for continuous collision. Collisions result in time loss. In addition to the time loss due to collisions, it can be also seen in the known topology that a coupling between two stations (e.g. node 1 and node 2 or node 1.1 and node 1.2) blocks the network for all other stations which cannot use the network during the communication of two stations. The shown "router" (communication from the lower network to the higher network in FIG. 4b) to which the host (also several hosts) is coupled, places a load on the network.

OBJECTS AND SUMMARY OF THE INVENTION

It is an object of the present invention to improve the operability of the spinning machine controls (with network) described in the state of the art and to accelerate the direct interaction of all the elements of the network which are connected together in a combination. Additional objects and advantages of the invention will be set forth in part in the following description, or will be obvious from the description, or may be learned through practice of the invention.

The present invention proposes that the data communications protocol for the exchange and the transmission of operation data and measured values of the higher communications level also be used for the lower communications level. To carry out this simplification of network protocols it is proposed to use a bus backplane on which several components, in particular several CPUs (central processing units) are coupled together. Each single bus backplane can stand for a spinning machine with its plurality of spinning stations in the case where the spinning mill machine is, for example, a rotor spinning machine.

Data communication makes it possible to improve the control of the machine group; the communication can be used without difficulty also to monitor the machine group.

The previously mentioned bus backplane hardware is not tied to any specific architecture, and bus backplanes of Intel (multibus I,II) or Motorola (VME) or others can be used. The bus backplane is, on the one hand, closely related to the machine controls and, on the other hand, closely related to the network. The tight coupling by the hardware structure is assisted by the selected software coupling, in which the communications protocol on the bus backplane and the communications protocol on the higher communications plane is the same, in particular a standardized protocol.

The bus system with the backplane can accept interface circuits (interfaces) of the most different types.

According to the invention, a non-deterministic bus is brought very close down to the spinning machine, and with respect to hardware closer than a conventional network (e.g. according to the Ethernet principle) would reach. On the other hand, the spinning machine must also be able to carry out deterministic tasks which are time-critical. For this purpose, suitable processors are connected to the bus backplane, making deterministic control, adjustment, and equidistant acquisition of scanned values possible. The bus backplane is therefore constructed advantageously as a multiprocessor bus backplane. If a multiprocessor bus backplane is used, the appertaining standard protocol is also suitable for multiprocessing, corresponding for example to the TCP/IP protocol.

The operativeness of the spinning machine controls is considerably improved with respect to time. However, improved speed is not the only advantage of the invention. Better structure and more flexible connection of the bus system components become possible, even when bus backplanes of different origin are used. In spite of the existing difficulties, the invention can avoid the initially mentioned access conflicts as well as be maintenance-friendly, so that programming costs are lowered considerably. The network also requires fewer overhead expenses.

The bus backplanes which can be assigned to each spinning machine may be interconnected in a local network so that a first group of spinning machines are connected together via this local bus. Several local busses can be connected via respective routers to a higher-rank network so that the host has access to all routers on all subnets which in turn are structured in several bus backplanes. Bus backplane and subnet have the same topology (i.e. the same data communications protocol), and this accelerates communication and structurally simplifies the system a considerable extent.

A network design which would be sufficient for most network controls of spinning machines consists of three levels, level j, level j+1, and level j+2. Level j is the level of the bus backplanes. It contains several bus backplanes BPi and these are connected via a network access to a local bus consisting of a cable. The local bus is the higher level j+1. The data communications protocol on level j+1 and that in the bus backplane BPi (of level j) is the same. From level j+1 a router leads to a superimposed level j+2 to which the control center (the host) is coupled. There are thus three levels, the level of the bus backplane, the level of the local bus which has a higher rank bus, and the level of the host which is coupled to the higher-rank bus. Between the superimposed level j+2 and the level j+1 directly below, the data communications is not the same; only between level j+1 and the level below (the level j of the bus backplane) is there identity of protocol.

The utilization of the general index j indicates that this configuration can be shifted up and down in more strongly hierarchically broken-down systems, but generally three levels are necessary to be able to use the invention in a purposeful manner, one level of these operating with the protocol of a typical network application and the two levels below with another protocol which, although still network-applicable, is however very narrowly oriented towards deterministic busses.

The enclosed figures through which several examples of embodiments shall be explained facilitate the understanding of the invention.

DETAILED DESCRIPTION OF THE PREFERRED EMBODIMENTS

Figure 1:
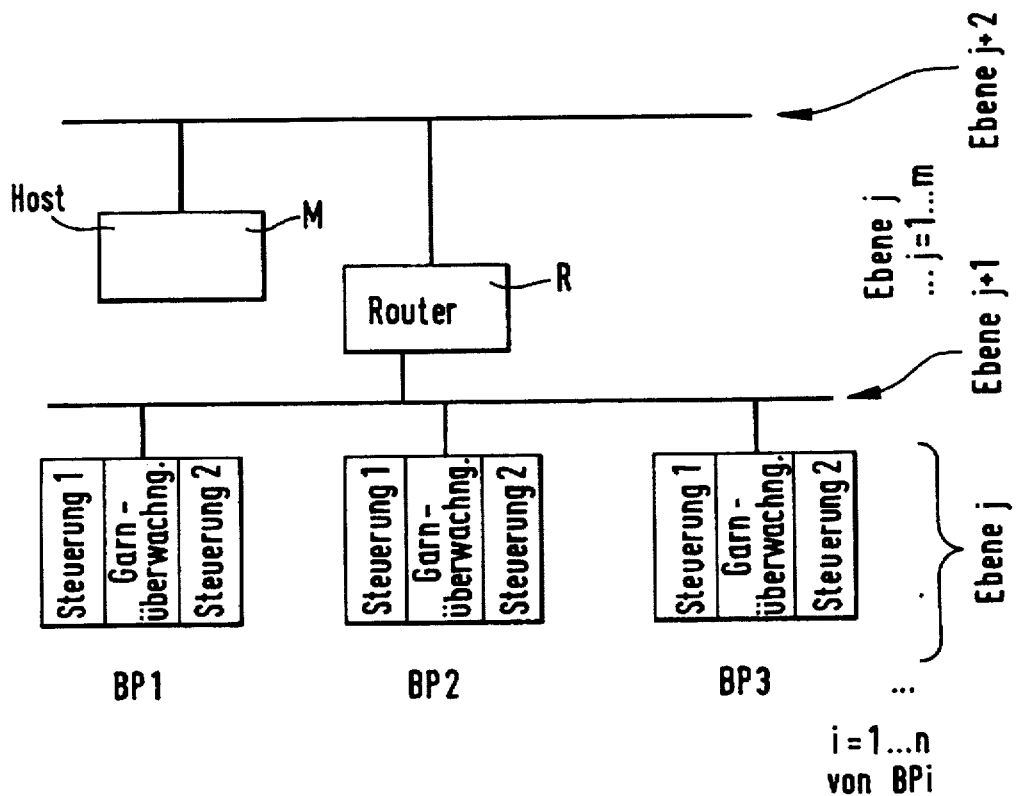
FIG. 1 is an example with three bus backplanes BP1, BP2 and BP3, and with three hierarchically staggered network busses, level j, level j+1 and level j+2, in the example j=1.

Reference will now be made in detail to the presently preferred embodiments of the invention, one or more examples of which are shown in the drawings. Each example is provided by way of explanation of the invention, and not as a limitation of the invention. For example, features illustrated or described as part of one embodiment can be used on another embodiment to yield still a further embodiment.

FIG. 1 shows an example of a combination of three bus backplanes BP1, BP2, BP3 which are switched together on a local bus (level j+1). A router R leads from the local bus to a superimposed bus which is designated by "level j+2" in FIG. 1. A host system M is connected to bus j+2 and takes over the central control of all routers R potentially coupled to the superimposed bus of level j+2. The multiple routers R may be found in an expanded system through the addition of the four components R, BP1, BP2, BP3 on the superimposed bus j+2. The system of FIG. 1 is insofar not limited. The system is however not limited to the number of backplanes BPi connected to the local bus in level j+1, but a plurality of these backplanes can be connected there. All these backplanes have however the same data communications protocol which is selected for TCP/IP in the example. UDP/IP is also possible.

Figure 2:
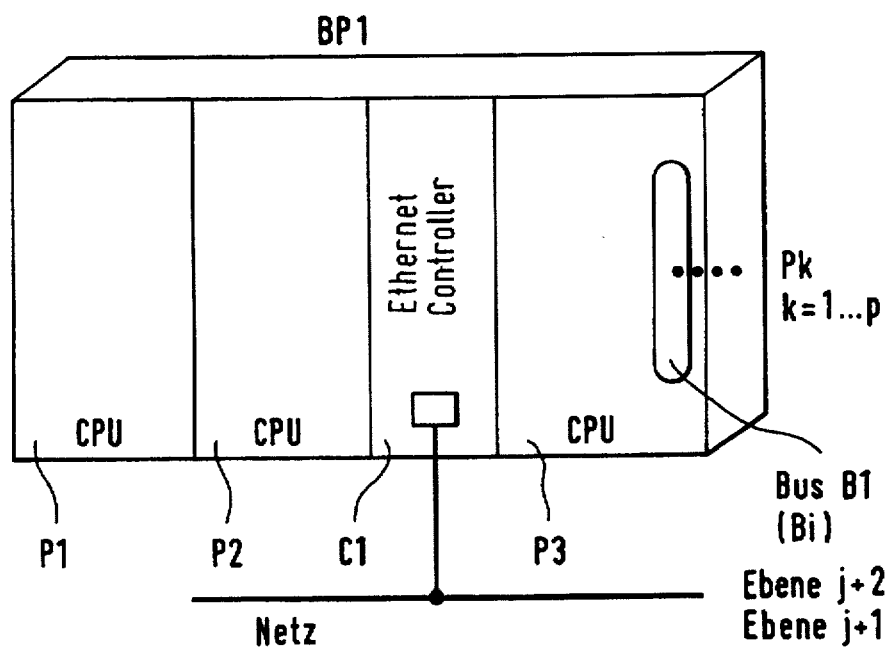
FIG. 2 illustrates a bus backplane of FIG. 1, the BP1, which contains an access module C1 allowing access from the bus backplane to the network-oriented bus of the level j+1 (or, in another embodiment, to the bus of level j+2 above it)

A backplane is selected in FIG. 2, backplane 1 (BP1) being selected as an example. On it can be recognized that several central units (CPU's) are connected to the backplane, and in the example of FIG. 2 there are three CPUs, P1, P2 and P3. One of these CPUs, here CPU P1, is connected via backplane BP1 to the Ethernet Controller C1 which couples the BP1 backplane on the network level. The level j+1 of FIG. 1 which lies directly (logistically) above the backplane BP1 can be taken as network level; but level j+2 of FIG. 1 which can be coupled directly to the backplane BP1 via a corresponding controller C is also a possible level. The single coupling, as well as the two couplings, can be switched as a function of the application at the moment; if both couplings are used, two network control systems (Ethernet Controller) C are used, one coupling the backplane BP1 to level j+2, the other coupling the backplane BP1 to the level j+1.

Backplane BP1 is schematically a hardware data bus and an address bus with an appertaining number of control circuits. Overall it is called bus B1.

By looking at FIGS. 1 and 2 together, the network topology clearly appears. In vertical direction three levels j, j+1 and j+2 are shown, whereby j may generally represent integral numbers from 1 to m. In horizontal direction the level j consists of several backplanes BPi, where i can assume integral numbers from 1 to n. Each backplane BPi may in turn contain a plurality of central units Pk, where K represents integral numbers from 1 to p. P is therefore representative of a multiprocessor system which is installed on a backplane.

A backplane is understood to be a board having a plurality of layers in which the plug-in points installed on it are connected to circuits. It can be compared roughly to a typical AT bus plate which is however not multiprocessor-capable like the backplane BP of FIGS. 1 and 2. Only the multiprocessor capability makes it possible for the communications protocol on the network of level j+1 to correspond to the communications protocol on the backplane.

Figure 3:
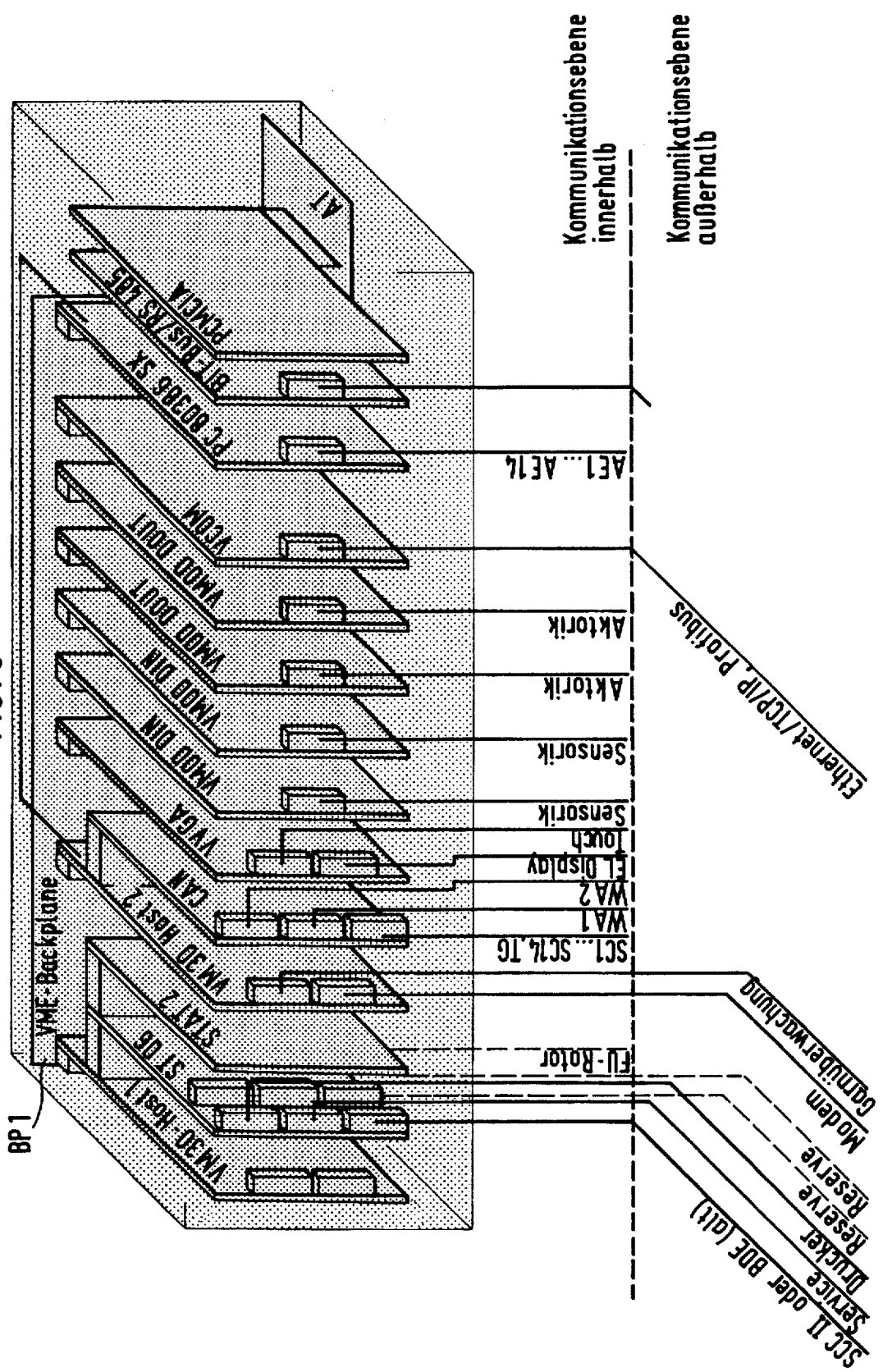
FIG. 3 shows in a schematic view a VME bus backplane which is coupled downwards via a processor (a CPU) to an AT bus and which is able to access the local TCP/IP bus of level j+1 of FIG. 1 via VCOM upwards. In this example the BP1 stands for one single machine with e.g. 280 spinning stations. The communications level represented by this figure is therefore "within the spinning machine" while the couplings to the outside (to the local bus) and to the other center units are regarded as "outside the machine"
Figure 4A:
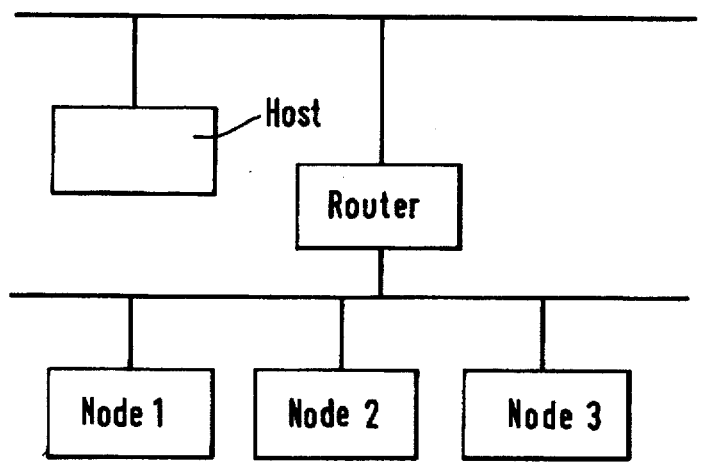
FIGS. 4a and 4b are diagrammatic representations of state of the art networks in which two topologies are shown in graphic simplification.
Figure 4B:
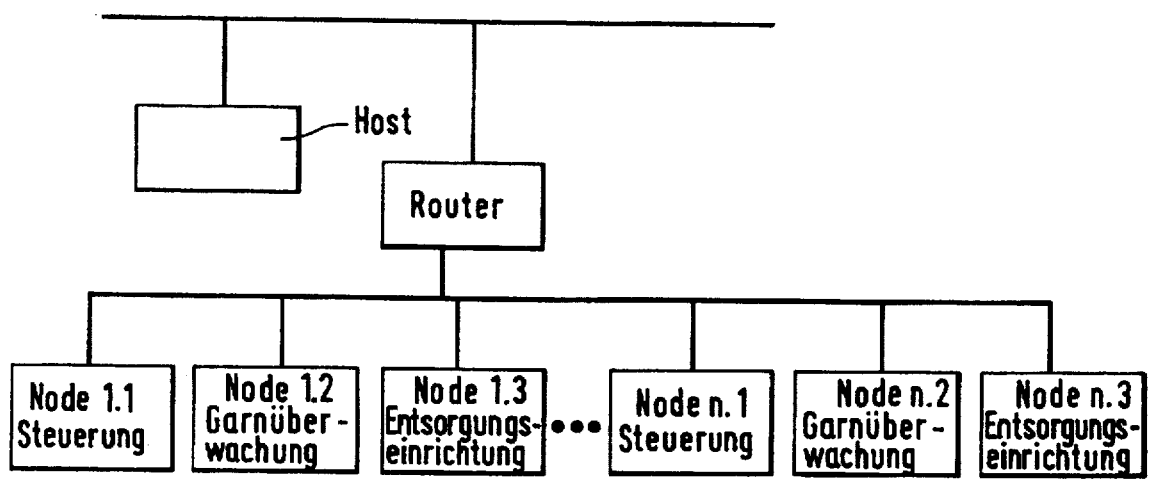

By contrast with FIGS. 1 and 2, as well as with the FIG. 3, yet to be discussed, representing examples of embodiments of the invention, circuits of the state of the art are explained in FIGS. 4a and 4b. Concerning FIG. 4a, it was already explained in the beginning why this topology is time-intensive, collision-prone, and has little structure. The network topology of FIG. 4b, which would be a possible alternative of that of FIG. 4a, leaves unsolved tasks and non-calculated load problems between the different functional units (called node 1.1 to node n.3). This results from the fact that many functional units (nodes) are not made by the same manufacturer and are therefore of different design. Each of these nodes may have a different architecture, so that no unity exists in the common network bus leading via the router to the host system, except if each of the systems were to be given a suitably adapted network coupling card. This coupling card slows down the system and increases the probability of collision, especially if the nodes 1.1, 1.2 and 1.3, which may belong to one machine for example, communicate with each other whereby the entire remaining bus is functionally blocked.

Instead of this, the network topologies with the backplane and the common data communications make it easy to survey backplane and higher-rank network connections, and they avoid collisions and increase speed. This is also made clear in FIG. 3 in which the backplane BP1 of FIG. 2 is shown schematically through a VME bus. A coupling card PC 80386 SX constitutes a connection in an AT bus which is deterministic. The plug-in card VCOM constitutes the coupling C1 of FIG. 2 which leads from the backplane BP1 to the local bus of level j+1 of FIG. 1.

In order to avoid misunderstandings in the designation of the busses, it is pointed out that the local bus is that of level j+1, not that of the backplane BP1. This bus is located on level j, a level below the network level j+1. Level j+2 is superimposed over the first network j+1 and cannot be seen in FIG. 3 but can be recognized if several VCOMs are switched together on the network level j+1 and if a router couples this local bus j+1 to the superimposed bus j+2.

In addition of the variant outlined above it is also possible to use VCOM of FIG. 3 together with VM30, which represents the CPU P1 of FIG. 2 in the drawing according to FIG. 3, as direct router R to the superimposed bus of level j+2. The router R is then physically contained in two separate cards, VM30 and VCOM.

The technical area of the invention is the area of spinning mill machines, such as spinning machines, and in it the control of a large number of spinning mill machines through one or several networks. The invention proposes that, in order to accelerate and improve direct interaction of all the stations controlled in the network combination, the data communications protocol of a bus made in the form of a backplane (BPi) and the data communications protocol (TCP/IP) of the higher communications level (those which are located logically above the backplane) be made identically.

It will be apparent to those skilled in the art that various modifications and variations can be made in the present invention without departing from the scope and spirit of the invention. For example, features illustrated or described as part of one embodiment may be used on another embodiment to yield a still further embodiment. It is intended that the present invention cover such modifications and variations as come within the scope of the appended claims and their equivalents.

I claim:

1. A control system for a group of spinning mill machines connected in combination for carrying out coordinated spinning operations, said system comprising:

a plurality of hierarchy communication levels, a lowest said communication level comprising at least one multiprocessor bus backplane assigned to each of said spinning mill machines, each said bus backplane comprising a plurality of deterministic microprocessors connected thereto for carrying out deterministic tasks associated with said respective spinning mill machine;

a next higher communication level, said next higher communication level comprising a local bus connecting together said multiprocessor backplanes;

a common deterministic data communications protocol for said multiprocessor backplanes and said local bus so that multiprocessors of each said backplane and different said backplanes can communicate bi-directionally with said deterministic data communications protocol;

said local bus coupled to a higher superimposed communication level which includes a host control system for said entire group of spinning mill machines, said local bus and said higher superimposed communication level coupled together through a common network communications protocol.

2. The system as in claim 1, wherein each said bus backplane comprises a multilayer board having a plurality of plug-in points for components.

3. The system as in claim 2, wherein at least one spinning machine control system and one yarn monitoring system are plugged-in as components of said bus backplane.

4. The system as in claim 1, wherein said next higher communication level and said higher superimposed communication level are network oriented, and further comprising a circuit for coupling of measured values and commands on said network-oriented levels.

5. The system as in claim 1, wherein said spinning mill machines include spinning machines having a plurality of spinning stations.

6. The system as in claim 1, further comprising a plurality of said local busses, each said local bus corresponding to a machine group, said system further comprising a plurality of routers coupling said local busses to said higher superimposed communication level for control of all of said machine groups from said higher superimposed communication level.

* * * * *